United States Patent [19]

Burns et al.

[11] Patent Number: 4,607,912

[45] Date of Patent: Aug. 26, 1986

[54] IN-LINE OPTICAL FIBER POLARIZER

[75] Inventors: William K. Burns, Alexandria; Carl A. Villarruel, Burke, both of Va.

[73] Assignee: The United States of America as represented by the Secretary of the Navy, Washington, D.C.

[21] Appl. No.: 558,744

[22] Filed: Dec. 7, 1983

[51] Int. Cl.[4] ........................... G02B 6/18; G02B 6/00
[52] U.S. Cl. .............................. 350/96.30; 350/96.15
[58] Field of Search ................ 350/96.29, 96.30, 96.15

[56] References Cited

U.S. PATENT DOCUMENTS

| | | | |
|---|---|---|---|
| 4,153,328 | 5/1979 | Wang | 350/96.11 |
| 4,291,940 | 9/1981 | Kawasaki et al. | 350/96.15 |
| 4,354,736 | 10/1982 | Maklad et al. | 350/96.30 X |
| 4,392,712 | 7/1983 | Ozeki | 350/96.15 X |
| 4,478,489 | 10/1984 | Blakenship et al. | 350/96.30 |
| 4,515,436 | 5/1985 | Howard et al. | 350/96.30 X |

OTHER PUBLICATIONS

Bergh et al., "Single-Mode Fiber-Optic Polarizer", Opt. Lett., vol. 5, No. 11, Nov. 1980, pp. 479–481.
Varnham et al., "Single-Polarisation Operation of Highly Birefringent Bow-Tie Optical Fibres", *Electron. Lett.* 19, 246, 1983.
Simpson et al., "A Single-Polarization Fiber", *Journal of Lightwave Technology*, vol. LT-1, No. 2, Jun. 1983, pp. 370-374.
Katsuyama et al., "Low-Loss Single-Polarisation Fibres", *Opt. Lett.*, vol. 17. No. 13, Jun. 25, 1981, pp. 473-474.
Birch et al., "Fabrication of Polarisation-Maintaining Fibres Using Gas-Phase Etching", *Electron. Lett.*, 18, 1036, 1982.

Primary Examiner—William L. Sikes
Assistant Examiner—Akm E. Ullah
Attorney, Agent, or Firm—Robert F. Beers; Sol Sheinbein; William T. Ellis

[57] ABSTRACT

A method and means for forming an in-line integrated optical fiber polarizer comprising the steps of providing a length of highly birefringent optical fiber, and thermal tapering one or more separated but approximately adjacent small sections of that optical fiber in order to reduce the core diameter at those sections. This core diameter reduction adjusts the V-value for the fiber so that polarization-dependent transmission effects become evident at the wavelength of operation.

15 Claims, 3 Drawing Figures

IN-LINE OPTICAL FIBER POLARIZER

BACKGROUND OF THE INVENTION

The present invention relates generally to optical polarizers, and more particularly to integrated in-line fiber optic polarizers.

There are a variety of optical applications which require polarized light. For example, optical gyroscope applications require one defined polarization in order to satisfy reciprocity conditions. Likewise, optical coherent communications systems require the use of polarized light in order to combine the light coherently.

Ordinary single mode optical fibers cannot hold a given polarization state of light, i.e. maintain the state of linear polarization along a defined axis. This is because in such a fiber the two polarization modes have very close propagation constants so that it is very easy to couple therebetween with the slightest perturbation. Accordingly, polarization holding optical fibers must be utilized in applications requiring polarized light. Currently, such polarization holding fibers are implemented by means of highly birefringent fibers or by means of the use of an elliptical fiber core. In the first case, a strain is placed on the fiber core so that the index of refraction is different in orthogonal directions. This difference in the index of refraction for orthogonal directions leads to different propagation constants for those directions. The polarization holding fiber acts to maintain a given input polarization with very little coupling between orthogonal polarization modes. However, both polarization directions will still be propagated in the fiber. If polarized light, i.e., light with a single polarization mode, is required, then some form of optical polarizer must be inserted into the optical fiber line. It is current practice to use bulk optic polarizers to effect this polarization function in the optical fiber system. Such bulk optic polarizers, for example, calcite crystal polarizers, are typically relatively large (on the order of one-half cubic inch) and require precise alignment in the system. These bulk optic polarizers also are subject to mechanical vibration and have a high insertion loss (output power/input power), thus increasing the attenuation on the polarization mode to be transmitted in the line. Accordingly, such bulk optic devices are not practical or desirable for optical fiber systems.

A number of polarizers which are integrated into the optical fiber line have been proposed in the art. The reference "Single-Mode Fiber-Optic Polarizer" by Bergh, Lefevre, and Shaw, Optics Letters, Nov. 1980, Vol. 5, No. 11, pp. 479, discloses the replacement of a portion of the fiber cladding with a birefringent crystal to couple unwanted polarizations from the optical fiber. Note that only an ordinary fiber is utilized in this reference. The reference "Single Mode Fibers With Asymmetrical Refractive Index Pits On Both Sides Of Core" by Hosaka, Okamoto, Sasaki and Edahiro, Electronics Letters, Mar. 5, 1981, Vol. 17, No. 5, pp. 191, discloses a polarizer with asymmetrical refractive index pits on both sides of the core. This side-pit fiber supports only a single polarization mode and propagates the other mode with very high loss. However, this side-pit polarizing fiber is difficult to manufacture in order to obtain the single-mode polarization.

A major difficulty with the foregoing integrated optical fiber polarizers is that they are not truly "in-line" with the polarization-holding optical fiber. These prior art fiber polarizers must be connected with a splice or fusion joint at which precise alignment is required. This alignment requirement creates a significant fabrication problem and thus makes such fiber polarizers impractical for optical systems.

OBJECTS OF THE INVENTION

Accordingly, it is an object of the present invention to form an in-line integrated optical fiber polarizer directly in the optical fiber system without disconnecting the optical fiber system.

It is a further object of the present invention to provide automatic alignment between a fiber polarizer and the system mode axes.

It is a further object of the present invention to eliminate the need for bulk optic polarizers in optical fiber systems.

SUMMARY OF THE INVENTION

Briefly, the above and other objects are achieved by reducing the fiber core diameter in a selected portion of a polarization holding optical fiber in order to adjust the V-value of the optical fiber until polarization-dependent transmission effects become evident at the optical wavelength of operation. In a preferred embodiment, this core reduction process is obtained by thermal tapering of a small portion of the polarization holding fiber. Typically, the small portion is on the order of 1 centimeter or less in length.

In a second embodiment of the present invention, the in-line optical fiber polarizer may comprise a plurality of separated but approximately adjacent small portions of the length of the polarization-holding optical fiber with each small portion having a thermally-tapered reduced core diameter for effecting polarization of the light signals propagating within the length of optical fiber. The use of more than one small portion of thermally tapered fiber permits the control of the extinction ratio for the unwanted polarization mode.

DETAILED DESCRIPTION OF THE PREFERRED EMBODIMENT

The polarizer of the present invention is fabricated directly in the optical fiber system without disconnecting that fiber system to thereby obtain automatic alignment between the polarizer and the system mode axes. This polarizer is formed in the optical fiber by reducing a small portion of the core diameter of the fiber to thereby adjust the V-value until polarization-dependent transmission effects become evident at the wavelength of interest. The V number is the normalized core diameter and is equal to $$V = \left(\frac{2\pi a}{\lambda}\right)(2n\Delta n)^{\frac{1}{2}},$$

where a is the core diameter, λ is the optical wavelength, n is the mean index of refraction for the core and the cladding, and Δn is the index difference between the core and the cladding. By decreasing the V number for a polarization-holding fiber, such as a highly birefringent fiber, that has a large difference in propagation constants between the polarization modes, it is found that one polarization mode becomes lossy before the other. It is speculated that this effect is due to tunneling to an outer cladding layer or microbending loss. It is this differential loss between the polarization modes that creates the polarizing effect.

In order to control the V number, the core diameter, a, is varied because the optical wavelength of operation is typically fixed. In a preferred embodiment, this core diameter reduction is obtained by means of thermal tapering applied to a section of otherwise normal polarization-holding fiber, thus building the polarizer directly into the fiber. A normal polarization-holding fiber is defined as one where both modes are low loss and well guided, and in which two linear polarization states are propagated without change.

There are a number of polarization holding fibers currently available which may be utilized in the present invention. For example, a fiber manufactured by Hitachi is well suited to this application. This Hitachi fiber is a 4-layer fiber with a core, an optical cladding, an elliptical stress inducing jacket, and an outer cladding. This fiber is described in more detail in the reference by T. Katsuyama et al., Electronic Letters 17, 473 (1981).

In the preferred embodiment of the present invention, the core diameter reduction to form the polarizer is accomplished by means of thermal tapering. Thermal tapering comprises the steps of first removing the jacket from a small section of the optical fiber, heating that small section of the optical fiber, and then stretching the fiber along its axial direction so that the diameter of the fiber, including the core, is reduced in the heated small section of the fiber.

Figure 1:
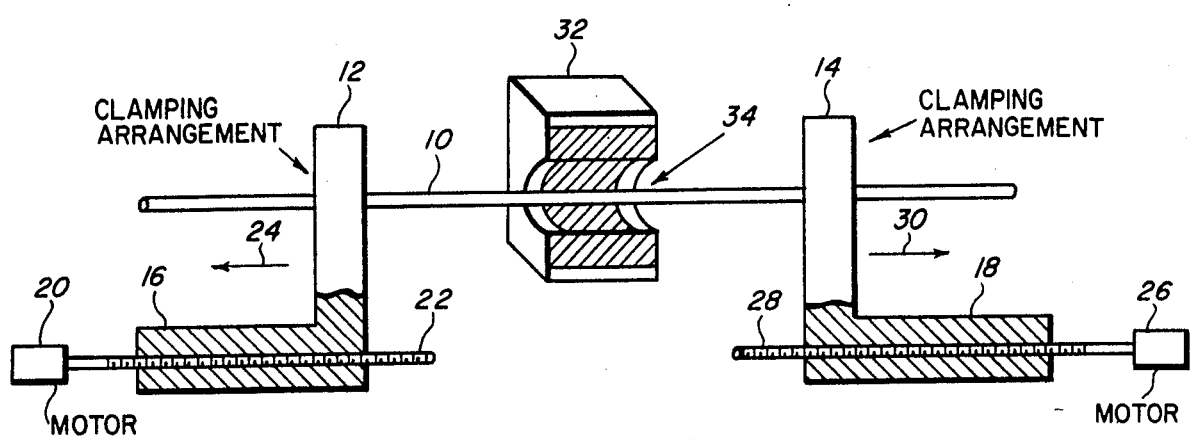
FIG. 1 is a schematic diagram of an apparatus for carrying out the method of the present invention.

An arrangement for carrying out the thermal tapering process is shown in FIG. 1. The fiber 10 in which the polarizer is to be formed is stretched between two L-shaped clamping arms 12 and 14. The horizontal portions of 16 and 18 of the clamping arms 12 and 14, respectively, each have a horizontal threaded hole therein. A motor 20 and a screw rod 22 arrangement are utilized in order to move the clamping arm 12 in the horizontal direction 24. Likewise, a motor 26 and a threaded rod 28 are utilized to move the clamping arm 14 in the horizontal direction 30. A miniature oven 32 with a central opening 34 is shown in cross section disposed between the two clamping arms 12 and 14. The oven 32 may have a length of 1-2 cm. Note however, that this oven length is not critical and can be increased or decreased as desired.

Prior to insertion in the oven 32, a small section of the fiber jacket (not the cladding) is removed in order to facilitate heating and softening of the fiber core. The jacket can be conveniently removed with a knife or by etching. Typically, the jacket is removed from a small section on the order of 2-3 cm. The jacketless section of fiber is then disposed in the central hole 34 in the oven 32.

In operation, the oven 32 is heated to approximately 1500°-1600° degrees C., at atmospheric pressure. This heating will cause the small portion of the fiber 10 within the central opening 34 in the oven to soften. The fiber 10 is heated in the oven 32 until the softening temperature of the glass fiber is reached. Then axial tension is applied to the ends of the fiber. This axial tension is obtained by activating the motors 20 and 26 to turn their respective screws 22 and 28 to thereby pull the clamping arms 12 and 13 in the directions 24 and 30, respectively. As the fiber 10 is stretched by these outwardly translating clamping arms 12 and 14, the glass therein begins to flow and the small heated portion of the fiber in the oven necks-down. By way of example, for a reduced diameter core with a desired length change of approximately 5 mm, the motors 20 and 26 are set to exert a pull rate of 1.5 mm per minute for a time of approximately 3.3 minutes. Note that the heating time depends on the pull rate, the oven temperature, and the desired reduced core diameter length. Typically, the reduced core diameter length will be less than or equal to 1 cm.

For an optical wavelength of 0.8 um, the diameter of the optical fiber is generally reduced by a factor of 2 from, for example, 4–5 microns to 2–2.5 microns.

Figure 2:
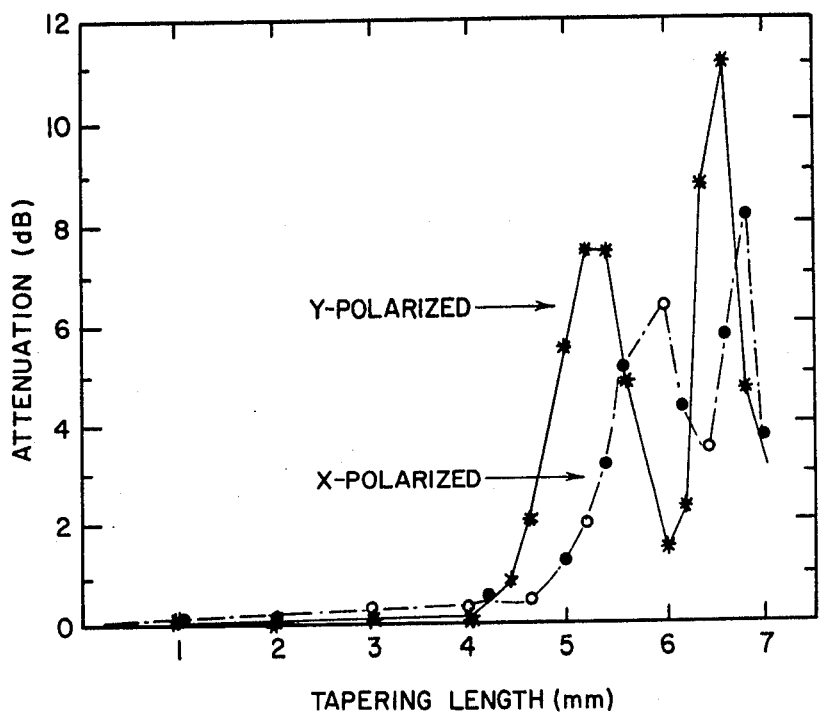
FIG. 2 is a graphical representation of the attenuation for two orthogonal polarization modes in terms of tapering length.

FIG. 2 illustrates the differential attenuation obtained between the two orthogonal polarizations designated the X polarization and the Y polarization, caused by the tapering process. It can be seen that the best differential attenuation is obtained between 4.5 and 5.25 mm for this particular fiber. After 5.25, the attenuation for the X polarization to be transmitted begins to rise. Note that the structure in the loss curves beyond 6 mm is thought to be due to coupling effects with the cladding modes. Note that FIG. 2 shows the differential attenuations obtained for a specific fiber with a given pull rate and temperature. If the processing parameters are varied or a different fiber is utilized, then the attenuation curves will change.

Figure 3:
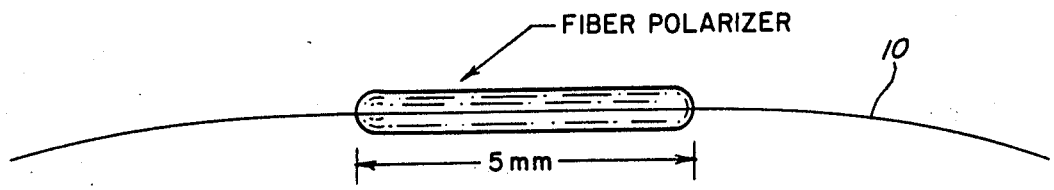
FIG. 3 illustrates the size of the in-line optical fiber polarizer after fabrication.

Because of the fact that the jacket for the fiber was removed in order to form the polarizer, this polarizer section is in a somewhat vulnerable state. Accordingly, a glass tube may be disposed over the jacketless polarizer section with the ends of the glass tube filled with epoxy. The polarizer section with the glass tube disposed therearound is shown in FIG. 3.

A number in-line polarizers of this type have been constructed to date. These polarizers have had a reduced diameter core length of approximately 5 mm and have exhibited 10-15 dB of polarization isolation with approximately 0.5 dB of thruput loss.

It should be noted that a number of these polarizers of the present invention can be strung together in series to achieve increased extinction ratio. These polarizers would be separated but approximately adjacent to each other on the optical fiber 10. Four such polarizers were constructed in series on a single fiber. This four-polarizer configuration realized a polarization isolation of approximately 30 dB and approximately 3 dB in loss on the transmitted polarization. Each of the reduced core diameter polarizer lengths (the active region) was less than or equal to 1 cm and each polarizer package was only 5 cm long. Accordingly, it can be seen that the small size of these polarizers and the low insertion loss allows them to be cascaded in order to achieve greater isolation or polarization extinction coupled with acceptable insertion loss.

The present method for forming a polarizer may be utilized with any polarization-holding fiber. Accordingly, this method could be utilized with stress-induced birefringent optical fiber or elliptical core optical fiber.

It can be seen from a review of FIG. 2 that the length of the tapered or reduced core diameter section affects the attenuation for each of the polarization modes. Note that any reduced core diameter length is acceptable if the thruput loss for the polarization mode to be transmitted is low while the attenuation loss for the unwanted polarization mode is high.

A further design option which avoids the need for a series of polarizers, is to construct a single long polarizer of on the order of 5-100 cm. For a stationary fiber which is necked-down at one point, there is an optimum length which is related to the necked-down diameter. (See FIG. 2.) In order to increase optimum length for a long polarizer, the necked-down core diameter must be controlled. This can be accomplished by slowly translating the fiber 10 in oven 32 as it is being heated in FIG. 1. This translation can be obtained simply by setting the motor 20, for example, to have a speed which is twice (or some other desired ratio) that of motor 26. Thus, the necking down region of the fiber is able to hold an optimum diameter for a longer length.

The polarizer of the present invention is fabricated directly in the optical fiber system so that automatic alignment of the polarizer axes with the birefringent fiber axes is obtained. This design essentially obviates the need for any type of bulk polarizer element and avoids the losses associated with splicing separate devices into the system.

The polarizer of the present design may be placed anywhere in the optical fiber system as long as access to the fiber is possible. Moreover, polarizers may be added even after the system is assembled. Note in particular that this polarizer design could be applied to the output leads of a birefringent fiber coupler to thereby automatically improve the isolation between the polarization modes in the coupler.

Finally, it should be noted that the size and insertion loss for this polarizer design allows it to be cascaded in order to obtain greater isolation with acceptable insertion loss. Typical reduced core diameter lengths are less than or equal to 1 cm and each device can be housed within a package of on the order of 5 cm in length. Longer discrete sections of polarizer can also be fabricated.

Obviously many modifications and variations of the present invention are possible in light of the above teachings. It is therefore to be understood that within the scope of the appended claims the invention may be practiced otherwise than as specifically described.

What is claimed and desired to be secured; by Letters Patent of the United States is:

1. An in-line integrated optical fiber polarizer comprising:
   a length of polarization holding optical fiber; and
   a first small portion on the order of 1 cm or less of said length of polarization-holding optical fiber having a thermally-tapered reduced core diameter for effecting polarization of light signals propagating within said length of optical fiber.

2. An integrated fiber polarizer as defined in claim 1, further comprising a protective jacket disposed around said small portion of polarization-holding optical fiber.

3. An integrated fiber polarizer as defined in claim 2, wherein a second small portion of said length of polarization-holding optical fiber has a thermally-tapered reduced core diameter.

4. An in-line integrated optical fiber polarizer comprising:
   a single length of polarization-holding optical fiber;
   a plurality of small portions of said length of polarization-holding optical fiber, each of said small portions having a thermally-tapered reduced core diameter for effecting polarization of light signals propagating within said length of optical fiber, said small portions being separated from each other but approximately adjacent to each other.

5. An integrated polarizer as defined in claim 4, wherein each of said small portions is on the order of 1 cm or less in length.

6. A method for forming an in-line integrated optical fiber polarizer comprising the steps of:
   providing a length of high-birefringence optical fiber;
   thermal tapering a plurality of separated but approximately adjacent small portions of said length of optical fiber in order to reduce the core diameter of these small portions of fiber.

7. A method as defined in claim 6, wherein said thermal tapering step comprises the step of thermal tapering to form each of said small portions to be on the order of 1 cm or less in length.

8. A method for forming an in-line integrated optical fiber polarizer comprising the steps of:
   providing a single length of polarization-holding optical fiber including a core; and
   reducing by thermal tapering the core diameter of a discrete portion of the length of polarization-holding fiber.

9. A method as defined in claim 8, wherein said core diameter reducing step comprises the step of thermal tapering said discrete portion of the length of said polarization holding fiber to obtain polarization-dependent transmission effects at an optical wavelength of interest to obtain polarization at this wavelength.

10. A method as defined in claim 9, wherein said thermal tapering step comprises the step of thermal tapering a small portion on the order of 1 centimeter or less of the length of said polarization holding fiber.

11. A method as defined in claim 10, wherein said thermal tapering step comprises the step of thermal tapering said small portion of the length of polarization-holding fiber to reduce the core diameter of the fiber by a factor of approximately two.

12. A method as defined in claim 10, wherein said polarization-holding fiber providing step comprises the step of providing a highly birefringent optical fiber.

13. A method as defined in claim 12, wherein said thermal tapering step includes the steps of:
   removing the jacket from a small section of the length of optical fiber;
   heating this jacketless small section of optical fiber; and
   stretching the fiber while stationary along its axial direction to obtain said small portion of the length of optical fiber of reduced core diameter.

14. A method as defined in claim 13, further comprising the step of disposing a protective jacket around said small portion of reduced core diameter fiber.

15. A method as defined in claim 13, comprising the step of disposing a glass tube around said small portion of reduced-core diameter fiber and epoxying said fiber within said glass tube.

* * * * *